United States Patent
Mariotti et al.

(10) Patent No.: US 8,231,326 B2
(45) Date of Patent: Jul. 31, 2012

(54) NOZZLE ADJUSTING MECHANISM AND METHOD

(75) Inventors: Gabriele Mariotti, Florence (IT);
Stefano Ghiraldo, Florence (IT);
Marcello Puggioni, Florence (IT);
Marcin Legat, Warsaw (PL)

(73) Assignee: Nuovo Pignone S.p.A., Florence (IT)

( * ) Notice: Subject to any disclaimer, the term of this patent is extended or adjusted under 35 U.S.C. 154(b) by 559 days.

(21) Appl. No.: 12/415,417

(22) Filed: Mar. 31, 2009

(65) Prior Publication Data
US 2010/0247287 A1      Sep. 30, 2010

(51) Int. Cl.
*F03B 1/04* (2006.01)
*F03B 3/18* (2006.01)
*F04D 29/56* (2006.01)

(52) U.S. Cl. .............. 415/1; 415/162; 415/167
(58) Field of Classification Search .......... 415/125, 415/150, 160, 163, 164, 167
See application file for complete search history.

(56) References Cited

U.S. PATENT DOCUMENTS

| 3,007,628 | A | * | 11/1961 | Nichols ................... 415/150 |
| 5,851,104 | A |   | 12/1998 | Dakin et al. |
| 2006/0112690 | A1 | * | 6/2006 | Hemer .................... 60/602 |
| 2007/0166149 | A1 |   | 7/2007 | Tacconelli et al. |

FOREIGN PATENT DOCUMENTS

JP      1-113576 A  *  5/1989

* cited by examiner

*Primary Examiner* — Stephen W Smoot
(74) *Attorney, Agent, or Firm* — Potomac Patent Group PLLC

(57) ABSTRACT

Method and nozzle adjustment mechanism for adjusting a flow of a fluid. The nozzle adjustment mechanism includes a fixed ring; at least a vane connected to the fixed ring by a pivot pin and configured to rotate with the pivot pin; an adjusting ring rotatably connected to the fixed ring and configured to rotate around a longitudinal axis of the nozzle adjustment mechanism; and a connection mechanism connecting the at least a vane to the adjusting ring and configured to move the at least a vane when the adjusting ring is rotated, the connection mechanism including a lever component and a link component connected to each other. The lever component is connected to the at least a vane and the link component is connected to the adjusting ring.

20 Claims, 10 Drawing Sheets

NOZZLE ADJUSTING MECHANISM AND METHOD

TECHNICAL FIELD

Embodiments of the subject matter disclosed herein generally relate to methods and devices and, more particularly, to mechanisms and techniques for actuating one or more vanes of a nozzle adjusting mechanism.

DISCUSSION OF THE BACKGROUND

During the past years, with the increase in price of fossil fuels, the interest in recovering energy from high-temperature or high-pressure gases has increased. However, the available devices are not as efficient as can be and suffer from certain limitations that are discussed later.

As any high-temperature or high-pressure gas is a potential resource for energy recovery, generator-loaded expanders or turbines or turboexpanders can be custom engineered to recover a large amount of useful energy available in the process.

One field in which turboexpanders play a role is waste heat recovery. Waste heat can be converted to useful energy with a turboexpander-generator alone or as a component in a more complex system. Potential heat sources include: tail gas from industrial furnaces or combustion engines, waste vapor from industrial furnaces or combustion engines, waste vapor from chemical and petrochemical processes, and solar heat from flat or parabolic reflectors. Exhaust gases are hot and may contain solvents or catalysts. An expander can not only recover energy and cool down exhaust gases which vent to the atmosphere, it can also separate solvents or catalysts.

Another field in which turboexpanders are useful is the extraction of useful work in pressure letdown applications. In pressure letdown applications, such as the merging of two transmission pipelines at different pressures or at a city gate of a gas distribution system, a turboexpander-generator can reduce the pressure of large volume gas streams while at the same time recovering energy in the form of electric power. An expander can therefore be a profitable replacement for other pressure regulating equipment such as control valves and regulators.

A turboexpander, also referred to as a turbo-expander or an expansion turbine, is a centrifugal or axial flow turbine through which a high-pressure gas is expanded to produce work that is often used to drive a compressor. Because work is extracted from the expanding high-pressure gas, the gas expansion may approach an isentropic process (i.e., a constant entropy process) and the low pressure exhaust gas from the turbine is at a low temperature, sometimes as low as $-90°$ C. or less.

Because of the low temperature generated, turboexpanders are widely used as sources of refrigeration in industrial processes such as the extraction of ethane and the formation of liquefied natural gas (NGLs) from natural gas, the liquefaction of gases (such as oxygen, nitrogen, helium, argon and krypton) and other low-temperature processes.

Such an example of a turboexpander is shown in FIGS. 1 and 2, which are reproduced from U.S. Pat. No. 5,851,104, the entire content of which is incorporated herein by reference. FIG. 1 shows a variable nozzle arrangement in a radial inflow turbine. The radial inflow turbine has a housing 10 with an annular inlet 12. A fixed circular plate 16 is positioned to one side of the annular inlet 12. The nozzle adjustment system is provided to the other side of the annular inlet 12. An adjusting ring 32 is arranged radially outwardly of a clamping ring 22. The adjusting ring 32 is able to rotate about the clamping ring 22 which is prevented from rotating by nozzle pivot pins 30 anchored in the fixed circular plate 16.

Vanes 40 are located about the annular inlet 12. These vanes are positioned between the fixed circular plate 16 on one side and the clamping ring 22 and adjusting ring 32 on the other. The vanes 40 are configured to provide a streamlined flow path therebetween. This path may be increased or decreased in cross-sectional area based on the rotational position of the vanes 40. The vanes 40 are pivotally mounted about the nozzle pivot pins 30. The relative positioning of the vanes 40 with respect to the clamping ring 22 is illustrated by the superimposed phantom line in FIG. 2.

In the 104' patent, the nozzle adjusting mechanism includes a cam and cam follower mechanism. Cam followers 44 are displaced laterally from the axis of the pins 30 and are fixed by shafts in the vanes 40, respectively, as shown in FIG. 2. The cam followers 44 rotate about the shafts freely. To cooperate with the cam followers 44, cams in the form of biased slots 48 are arranged in the adjusting ring 32. They are sized to receive the cam followers 44 so as to allow for free-rolling movement as the adjusting ring 32 is rotated.

The above described arrangement of the vanes 40, cam followers 44, biased slots 48 and the adjusting ring 32 make the opening of the vanes 40 linearly dependant on a rotation of the adjusting ring 32. In other words, a given rotation of the adjusting ring 32 produces the same preset rotation of the vanes 40 irrespective of whether the vanes 40 are near an opened position, are in an opened position, are near a closed position or are in a closed position. This constant rotation of the vanes 40 with the rotation of the adjusting ring 32 does not allow for any varied sensitivity in the adjustment of the position of vanes 40.

In some traditional turboexpanders an adjusting ring directly slides on vanes, which produces friction and may damage part of the adjusting ring and/or vanes. The same sliding motion may prematurely wear the adjusting ring and/ or vanes. Also, in some traditional turboexpanders two forces are applied at different locations of the adjusting ring that create an undesired torque. A first force acts on the adjusting ring due to a mechanism that actuates the adjusting ring while a resistance force occurs on the adjusting ring at a connection between the adjusting ring and vanes. The occurrence of these two forces on the adjusting ring create a torque, which tends to press the adjusting ring on part of the vanes, introducing further friction and wear to the components of the turboexpander.

Accordingly, it would be desirable to provide devices and methods that avoid the afore-described problems and drawbacks.

SUMMARY

According to one exemplary embodiment, there is a nozzle adjustment mechanism that includes a fixed ring; at least a vane connected to the fixed ring by a pivot pin and configured to rotate with the pivot pin; an adjusting ring rotatably connected to the fixed ring and configured to rotate around a longitudinal axis of the nozzle adjustment mechanism; and a connection mechanism connecting the at least a vane to the adjusting ring and configured to move the at least a vane when the adjusting ring is rotated, the connection mechanism including a lever component and a link component connected to each other. The lever component is connected to the at least a vane and the link component is connected to the adjusting ring.

According to still another exemplary embodiment, there is a radial inflow turbine including a frame and a nozzle adjusting mechanism connected to the frame and configured to adjust an inflow of a fluid. The nozzle adjusting mechanism includes a fixed ring, at least a vane connected to the fixed ring by a pivot pin and configured to rotate with the pivot pin, an adjusting ring rotatably connected to the fixed ring and configured to rotate around a longitudinal axis of the nozzle adjustment mechanism, and a connection mechanism connecting the at least a vane to the adjusting ring and configured to actuate the at least a vane when the adjusting ring is rotated, the connection mechanism including a lever component and a link component connected to each other. The lever component is connected to the at least a vane and the link component is connected to the adjusting ring.

According to another exemplary embodiment, there is a method for adjusting an inflow of a fluid via a nozzle adjustment mechanism. The method includes rotating an adjusting ring which is rotatably connected to a fixed ring and configured to rotate about a longitudinal axis of the nozzle adjustment mechanism; transmitting a force from the rotated adjusting ring to at least a vane via a connection mechanism connecting the at least a vane to the adjusting ring, the connection mechanism including a lever component and a link component connected to each other; and actuating, as a consequence of the rotation of the adjusting ring, the at least a vane connected to the fixed ring by a pivot pin, the actuation resulting in rotating the at least a vane with the pivot pin, the lever component being connected to the at least a vane and the link component being connected to the adjusting ring.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a turboexpander. However, the embodiments to be discussed next are not limited to this system, but may be applied to other systems that uses an inflow of a fluid having a large temperature and/or pressure.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
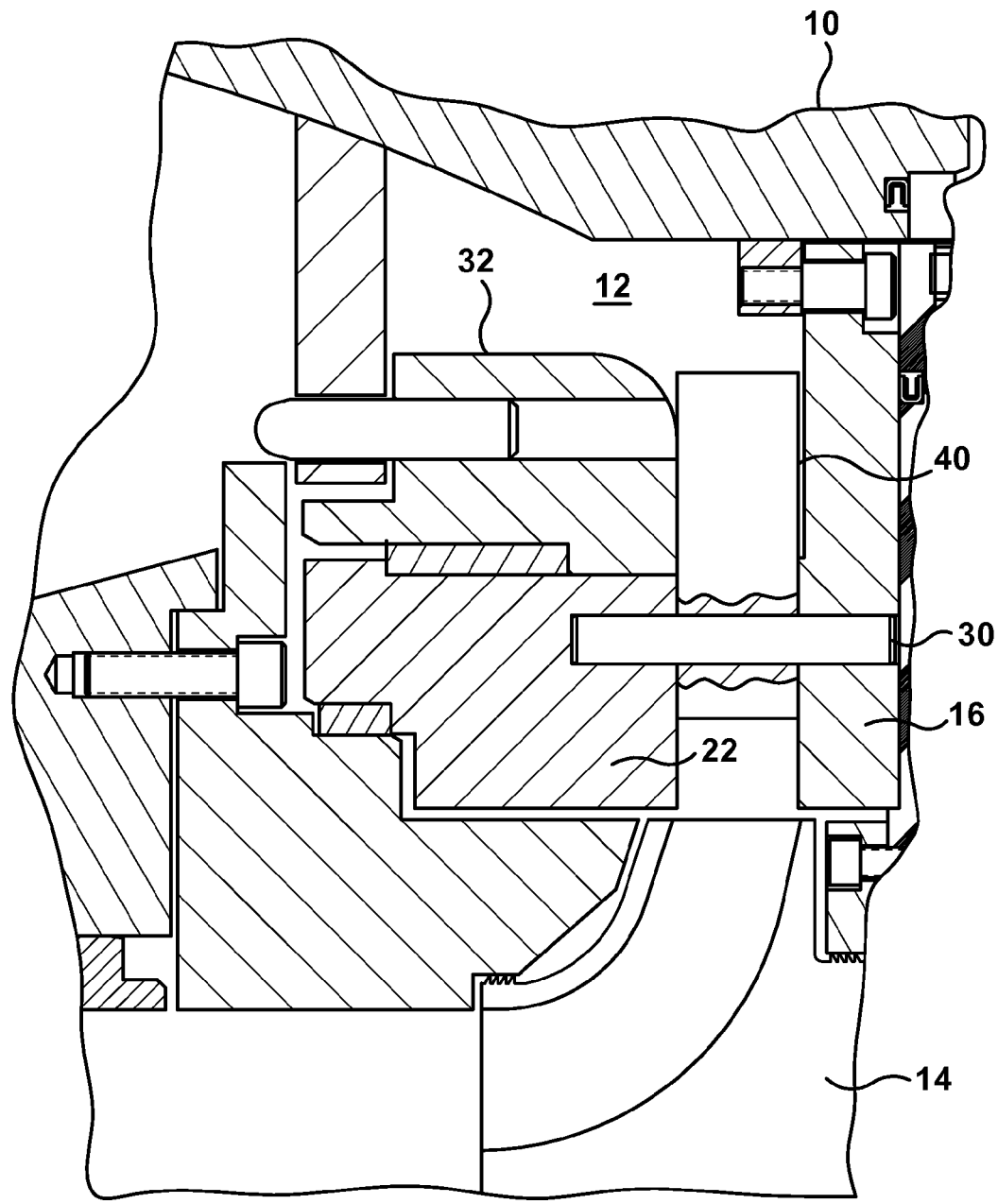
FIG. 1 is a cross-section view of a conventional nozzle adjustment mechanism.
Figure 2:
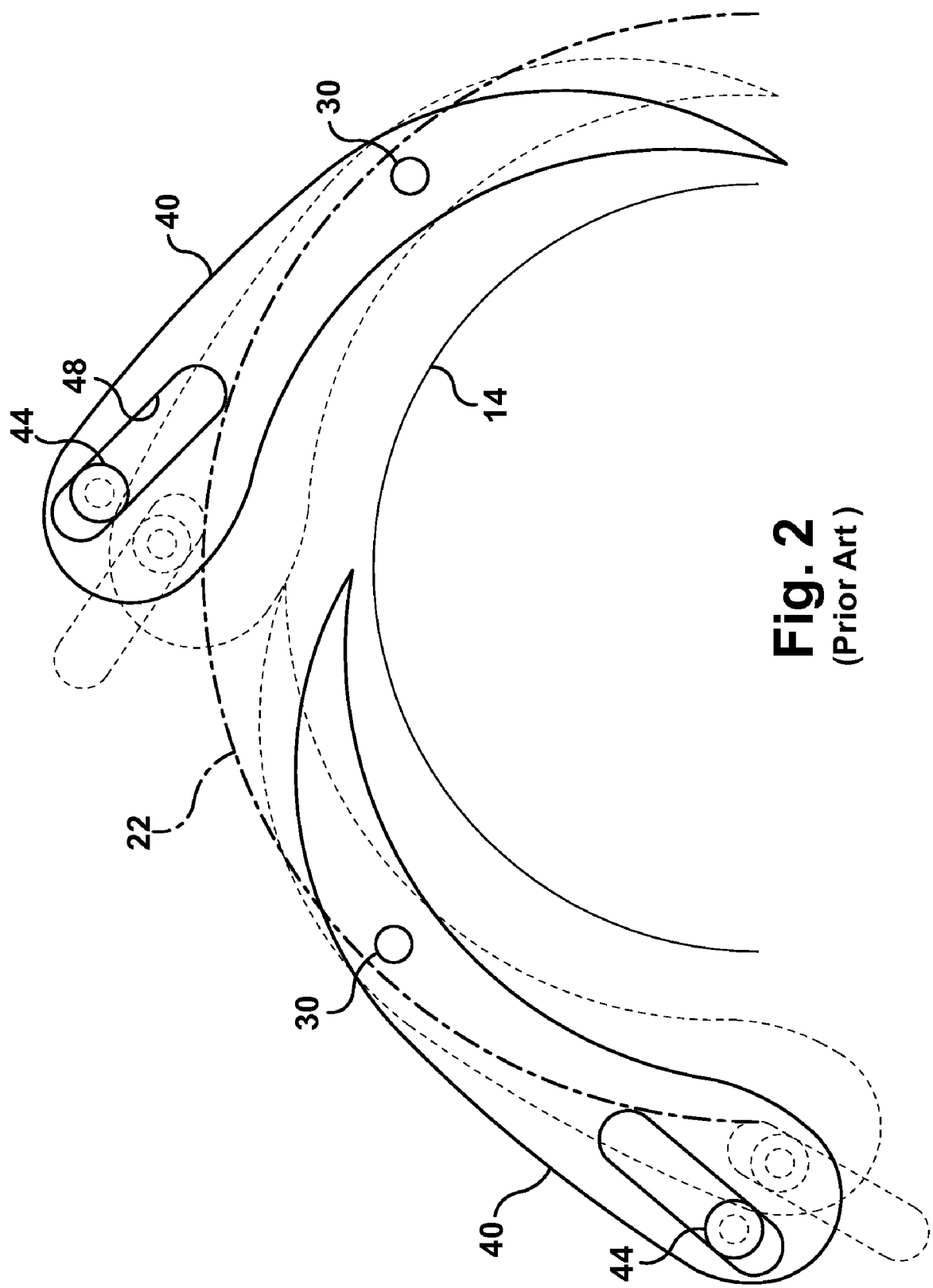
FIG. 2 is a top view of the conventional nozzle adjustment mechanism of FIG. 1.
Figure 3:
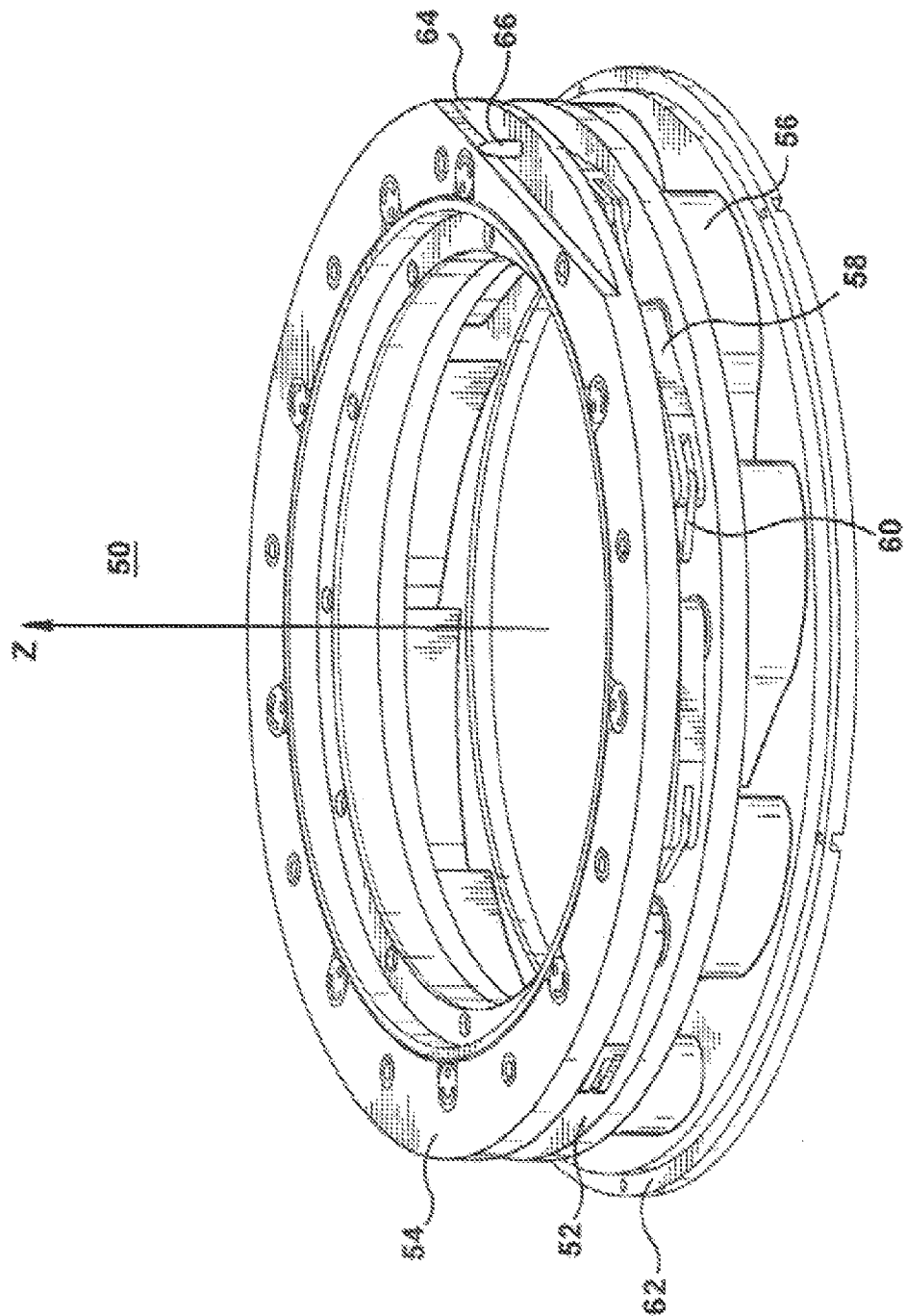
FIG. 3 is a schematic diagram of a nozzle adjustment mechanism according to an exemplary embodiment.

As shown in FIG. 3, a nozzle adjustment mechanism 50 includes a fixed ring 52 and an adjusting ring 54. The adjusting ring 54 is slidably connected to the fixed ring 52 as will be discussed later. Vanes 56 are connected to the fixed ring 52 with pivot pins (not shown). Thus, vanes 56 may rotate about the pivot pins. Vanes 56 are connected via a connecting mechanism or device (58 and 60) to the adjusting ring 54. The connecting mechanism includes, according to an exemplary embodiment, a lever component 58 and a link component 60. The lever component 58 is physically connected to the link component 60.

According to an exemplary embodiment, vanes 56 are sandwiched between the fixed ring 52 and a nozzle cover 62. The lever component 58 and the link component 60 are sandwiched between the fixed ring 52 and the adjusting ring 54. The adjusting ring 54 may rotate around a longitudinal axis Z of the nozzle adjustment mechanism 50 while the fixed ring 52 is fixed to the nozzle cover 62. The adjusting ring 54 may include a slot 64 having a pin 66. The pin 66 may be connected to an actuation device (not shown) which may generate the rotation of the adjusting ring 54. The actuation device may be an electric device, a pneumatic device, a manual device, etc. that are controlled by a user and/or a computing device.

Figure 4:
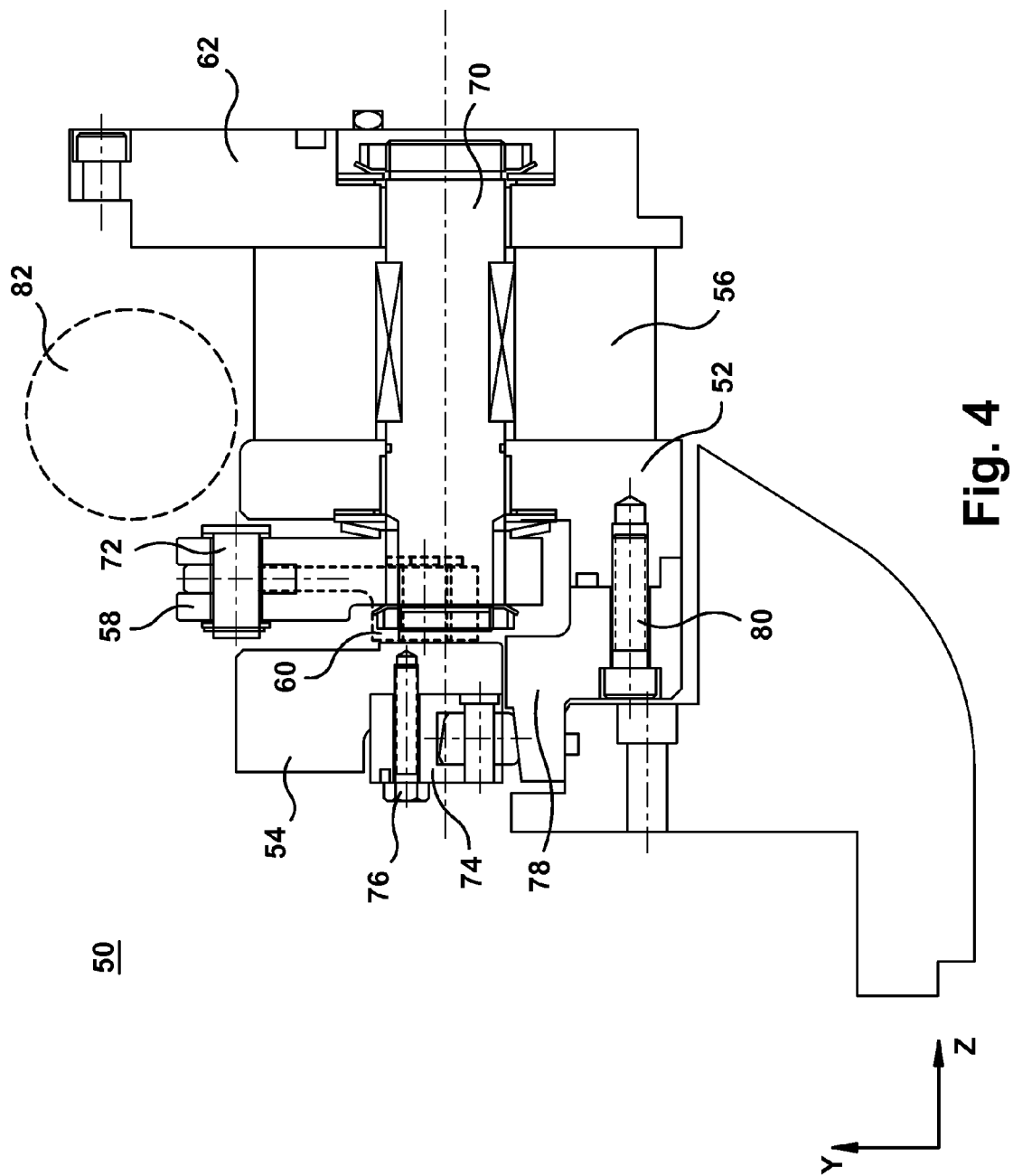
FIG. 4 is cross section view of a nozzle adjustment mechanism according to an exemplary embodiment.

A cross section of the nozzle adjustment mechanism 50 is shown in FIG. 4. The vane 56 is shown placed between the fixed ring 52 and the nozzle cover 62 while the lever component 58 and the link component 60 are placed between the fixed ring 52 and the adjusting ring 54. According to an exemplary embodiment, more than one link component 60 may be used. The pivot pin 70 connects the nozzle cover 62 to the vane 56 and to the fixed ring 52. Pin 72 connects the lever component 58 to the link component 60. The link component 60 is partially visible in FIG. 4 as part of the link component 60 is behind the lever component 58.

The adjusting ring 54 may be connected to a supporting ring 74 with a pin 76 while the adjusting ring 54 and the supporting ring 74 may rotate around the longitudinal axis Z while sliding on an extension element or ring 78 that is fixed to the fixed ring 52 by a pin 80. The pivot pin 70 is fixed relative to the vane 56 so that a rotation of the pivot pin 70 determines a rotation of the vane 56. Other arrangements for supporting the adjusting ring 54 are possible as will be appreciated by those skilled in the art.

The arrangement shown in FIGS. 3 and 4 advantageously prevents a torque to be applied by the adjusting ring 54 on vanes 56 as the adjusting ring 54 is separated from the vanes 56 by at least the fixed ring 52. Thus, the rotation of the vanes 56 is not affected by a contact with the adjusting ring 54. In addition, the arrangement of FIGS. 3 and 4 has a technical effect of preventing a contact between the adjusting ring 54 and the vanes 56. Further, the lever and link system advantageously reduces turbulences in an area 82 (see FIG. 4) of the inflow fluid by being able to adjust the opening of the vanes in a non-linear way.

Figure 5:
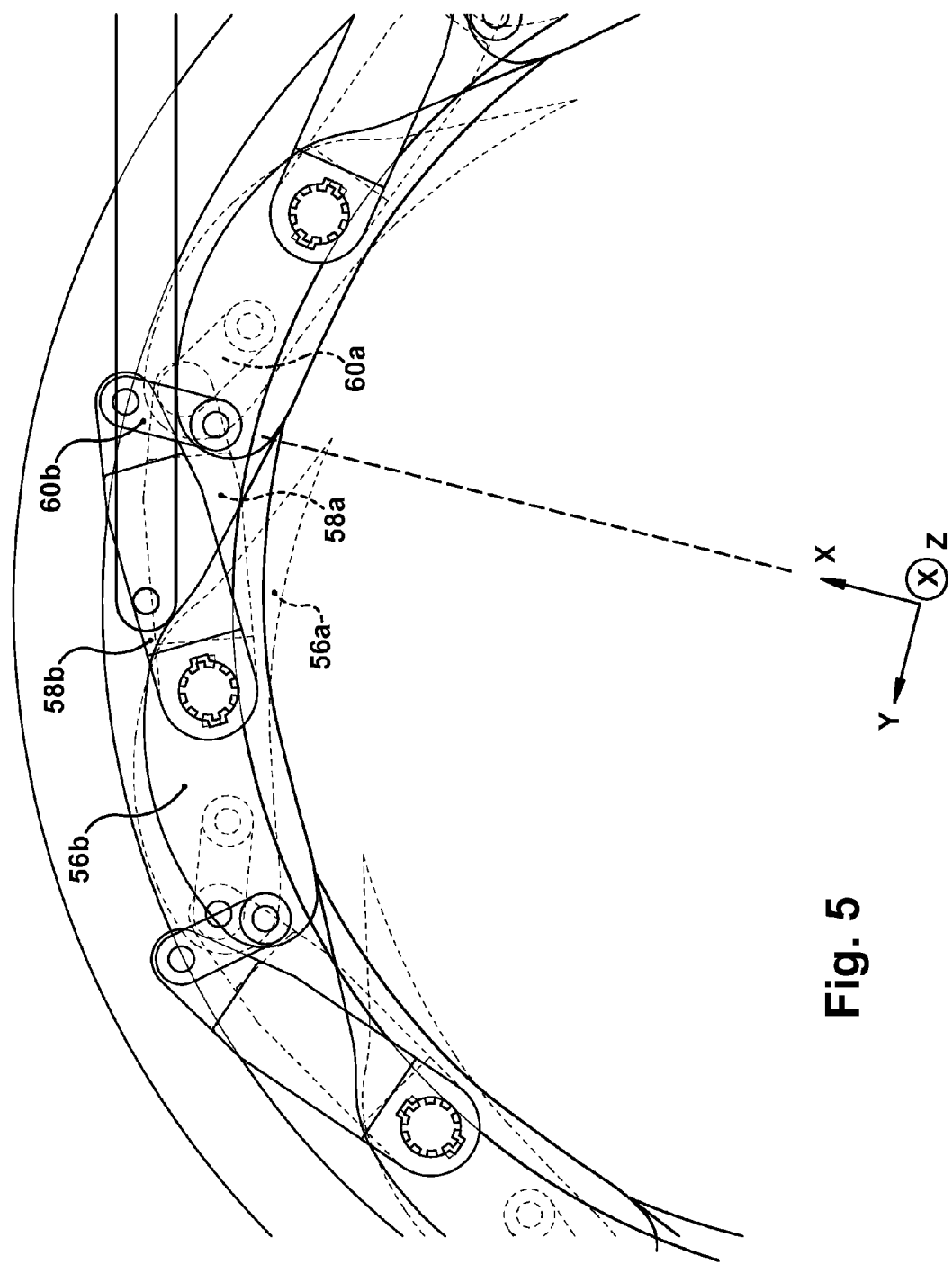
FIG. 5 is a top view of selected parts of a nozzle adjustment mechanism according to an exemplary embodiment.
Figure 6:
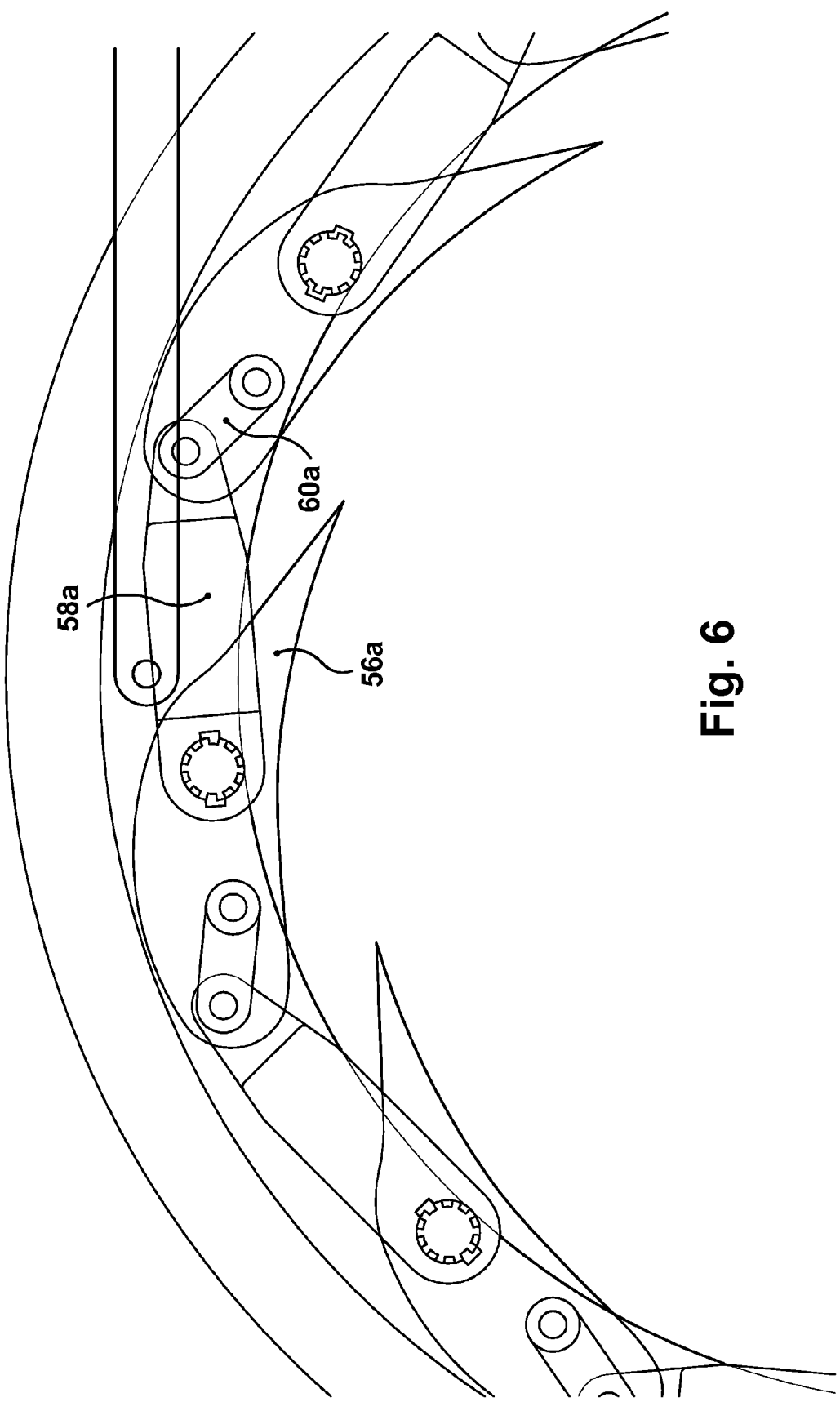
FIG. 6 is a top view of a nozzle adjustment mechanism having opened vanes according to an exemplary embodiment.
Figure 7:
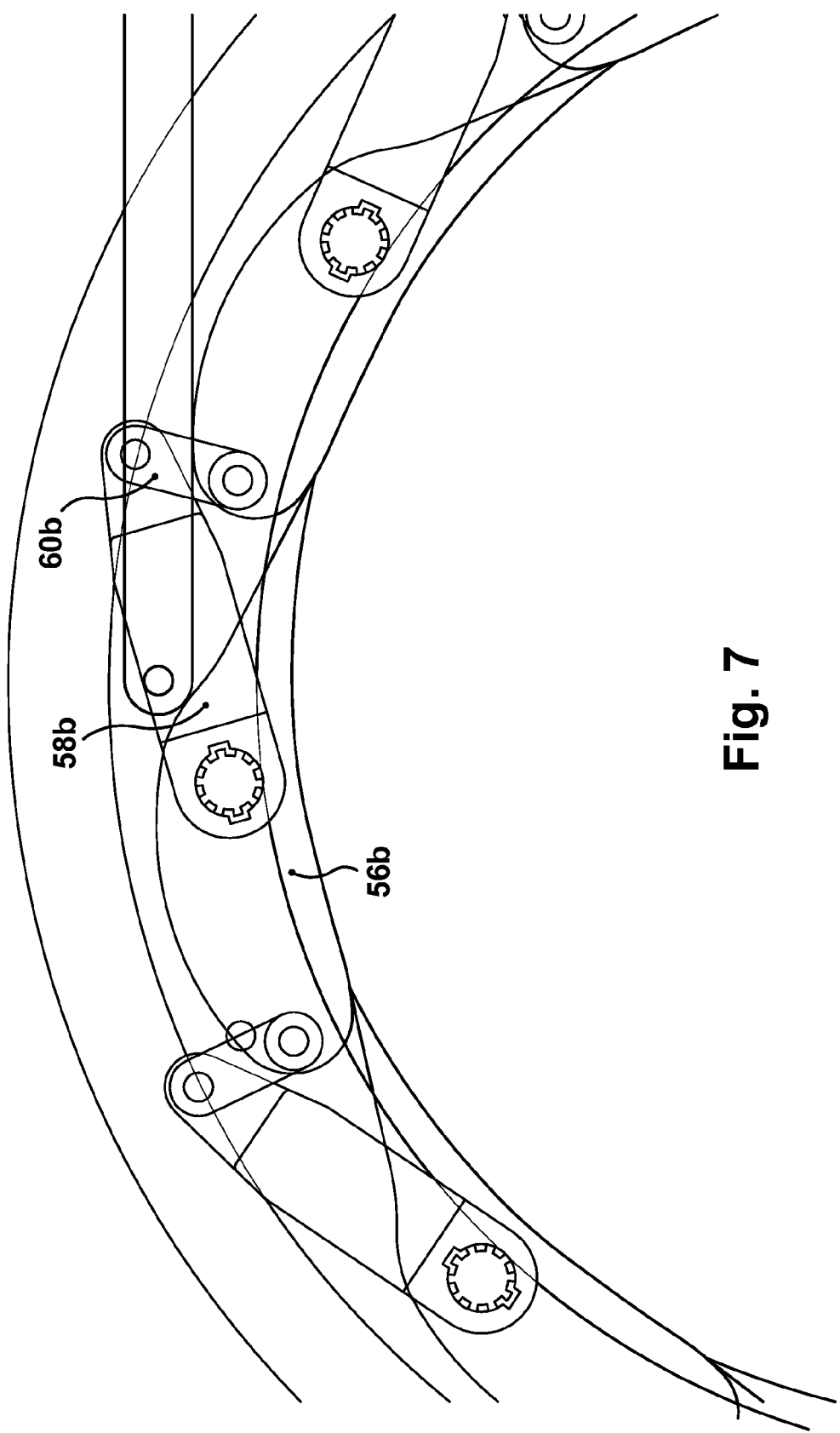
FIG. 7 is a top view of the nozzle adjustment mechanism having closed vanes according to an exemplary embodiment.

According to an exemplary embodiment shown in FIG. 5, vanes 56 have an opened position 56a and a closed position 56b. In the closed position 56b, each vane is in direct contact with adjacent vanes such that the inflow of the fluid is prevented. In the opened position 56a, a maximum inflow of the fluid is permitted. For the opened position 56a of the vane 56, the position of the lever component 58 is indicated as 58a and the position of the link component 60 is indicated as 60a. For the closed position 56b of the vane 56, the position of the lever component 58 is indicated as 58b and the position of the link component 60 is indicated as 60b. For more clarity, FIG. 6 shows the vanes in an opened position while FIG. 7 shows the vanes in a closed position.

According to an exemplary embodiment, when the vane 56 is in the closed position 56b, the link component 60 has a position 60b such that a radial axis of the link component 60 points to the longitudinal axis Z of the nozzle adjustment mechanism 50. This position 60b of the link component 60 has one or more advantages that are discussed with regard to FIGS. 6 and 7. However, according to other exemplary embodiments, the link component 60 does not have to be radially aligned when a corresponding vane 56 is closed.

Figure 8:
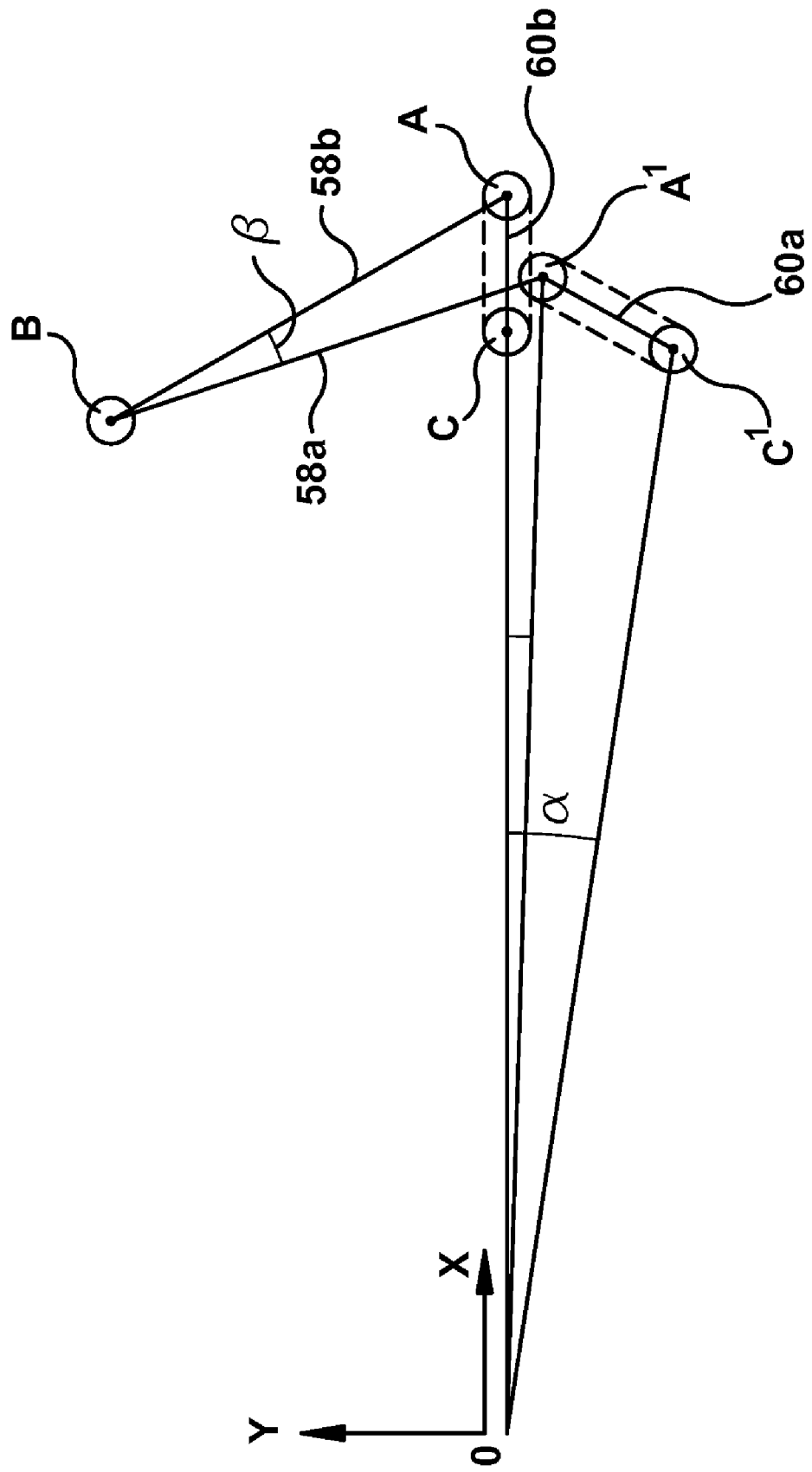
FIG. 8 is a schematic diagram of selected parts of a nozzle adjustment mechanism according to an exemplary embodiment.

FIG. 8 shows, for simplicity, only the lever component 58 and the link component 60. Both components are represented in FIG. 8 by a single line. According to an exemplary embodiment, a ratio of the length of the lever component 58 to a length of the link component 60 is between 1 and 10. The position ends of the lever component 58 are labeled A and B when vane 56 is closed and A' and B when vane 56 is opened, and the ends of the link component 60 are labeled A and C when the vane 56 is closed and A' and C' when the vane 56 is opened. A rotation of the adjusting ring 54 (not shown in FIG. 8) by an angle $\alpha$ produces a rotation of the vane 56 by an angle $\beta$. The rotation of the adjusting ring 54 is performed relative to the longitudinal axis Z of the nozzle adjustment mechanism and is measured by angle $\alpha$ as shown in FIG. 8, for example, measuring a rotation of the end C of the link component 60 relative to the Z axis. Further, the rotation $\beta$ of vane 56 is defined by an angular displacement of an axial axis of the vane 56 relative to the pivot pin 70. In an exemplary embodiment, the rotation $\beta$ of vane 56 is the same with the rotation of the lever component 58 relative to its end B, which is connected to vane 56, as shown in FIG. 8. When vane 56 is moving from closed to opened, angle $\alpha$ is larger than angle $\beta$, which indicates that a predetermined rotation of the adjusting ring 54 achieves a small opening of the vane 56. When vane 56 is fully opened and the operator starts closing the vane, i.e., for the same predetermined rotation of the adjusting ring 54, a large closing of vane 56 is achieved. This example illustrates the differential rotational sensitivity of the vanes 56 as a function of the adjusting ring 54.

Figure 9:
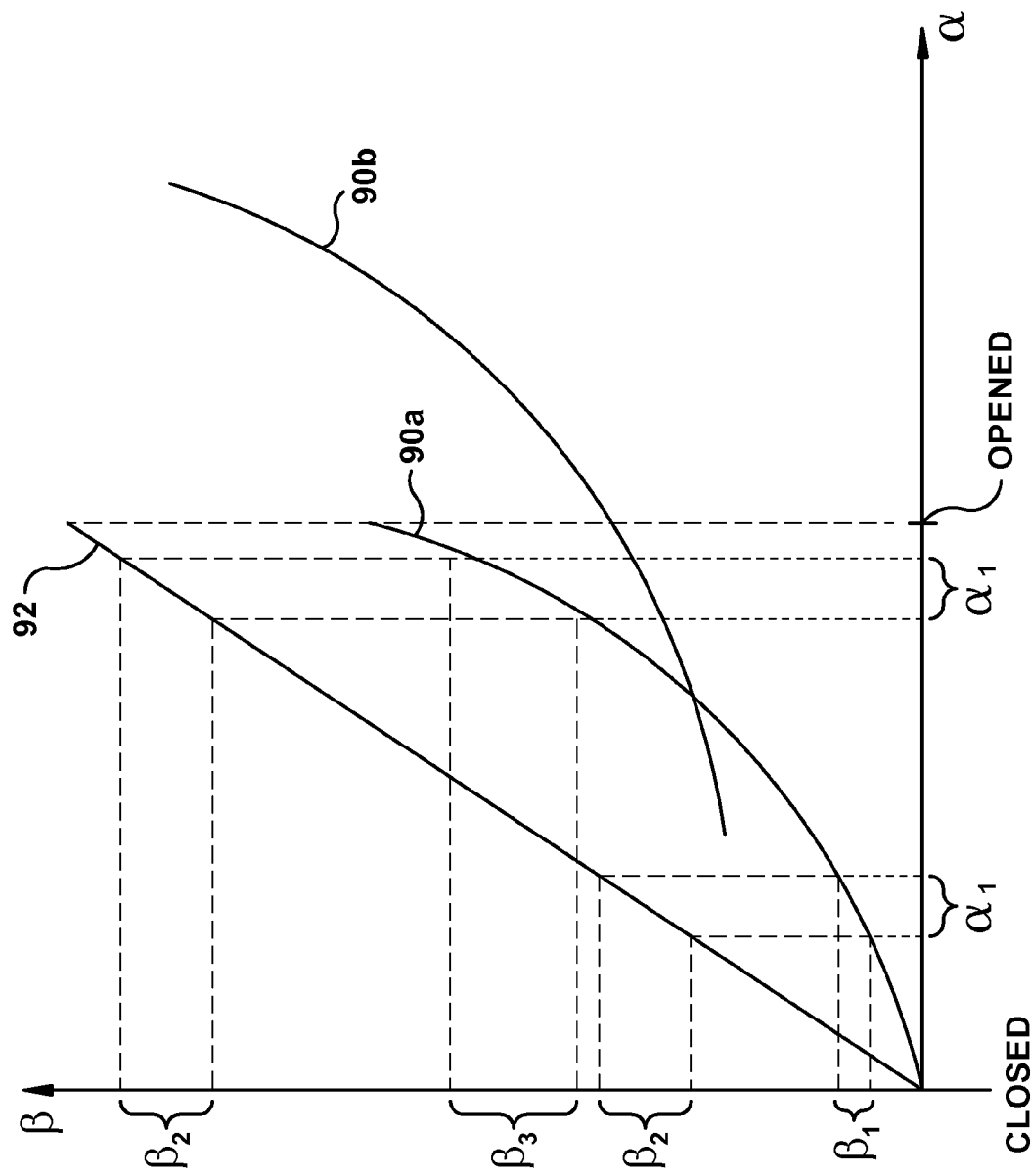
FIG. 9 is a graph showing a relationship between a rotation angle of an adjusting ring and a rotation angle of a vane.

The relationship between the rotation of the adjusting ring 54 and the rotation of the vane 56 discussed above is illustrated in FIG. 9 by line 90a. The y-axis of the graph corresponds to the rotation angle $\beta$ of the vane 56 while the x-axis of the graph corresponds to the rotation angle $\alpha$ of the adjusting ring 54. For line 90a, at the closed position of the vane 56 both rotation angles $\alpha$ and $\beta$ of the adjusting ring 54 and the vane 56 are zero. However, according to another exemplary embodiment, the close position is not defined by zero angles, as shown by line 90b. FIG. 9 shows two examples of a non-linear relation between the rotation of the adjusting ring 54 and the rotation of the vane 56. Depending on the length of the lever component and the link component, the line 90a may have different shapes. Also, depending whether further links are inserted between the lever component and the link component, the shape of lines 90a or 90b may change. For comparison, a linear angular relationship 92 for a traditional nozzle adjusting mechanism is also shown.

The non-linear characteristic of the nozzle adjusting mechanism according to the present embodiment allows a more sensitive control of the vanes 56 when the vanes are closed as discussed next. FIG. 9 shows that for a predetermined rotation $\alpha 1$ of the adjusting ring 54, a rotation $\beta 1$ of vanes 56 is achieved for the non-linear relationship 90a. For the same predetermined rotation $\alpha 1$ of an adjusting ring of a conventional device, a larger rotation $\beta 2$ of the vanes is achieved. However, when applying the predetermined rotation $\alpha 1$ to the vanes that are almost closed, a rotation $\beta 3$ is achieved for the vanes 56 of the present nozzle mechanism and a same rotation $\beta 2$ is achieved for a conventional device. Thus, FIG. 9 shows that for a conventional device the same rotation of the vanes is achieved for a given rotation of the adjusting ring. On the contrary, the novel mechanism achieves different vanes rotations $\beta 1$ and $\beta 3$ for a same rotation $\alpha 1$ of the adjusting ring and these rotations depend on an opening/closing state of the vanes. Therefore, a differential opening/closing mechanism of the vanes is achieved.

According to an exemplary embodiment, a nozzle mechanism is associated with a radial inflow turbine. More specifically, the nozzle mechanism may be a variable primary nozzle for such turbine. The nozzle mechanism has a variable geometry due to the controlled pivotal motion of the vanes. Because the vanes are mounted between two flat walls that are clamping together the vanes, a gas blow across each vane may be avoided. The rotation of the vanes is provided by the pivot pin connected to the vanes, the pivot pin being moved by the actuating ring via a connection mechanism. The connection mechanism may be configured to produce a non-linear and progressive vane opening law in such a way that the sensitivity of the system is higher when the nozzles are closed. This goal may be implemented by a linkage composed by two or more arms configured in such a way to reproduce the desired progressive opening law. The pivot pin that is providing the motion of the vane may be mounted onto a frame that supports the actuation ring. The frame may include two parts bolted together in order to have the possibility to install a seal ring in a radial position that would allow to compensate the axial loads on the vanes. A pneumatic, electric or hydraulic cylinder may be associated with the rotatable adjusting ring to control the position of the adjusting ring, in turn controlling the vanes.

According to an exemplary embodiment, the vanes, the frame and/or the nozzle cover may be coated with antifriction coating, for example, Thermal spray Praxair SR205 (from Praxair, Inc., Danbury, Conn.) or similar.

According to still another exemplary embodiment, while the traditional nozzle adjusting mechanisms contemplate separate rings for nozzle adjustment and seal-ring of the nozzle to compensate clamping of the primary vane, which need precise machining of slots on a large actuation ring supported by a Teflon piston ring, the novel nozzle adjusting mechanism of one or more disclosed embodiments will reduce the actuation forces that sometimes induce vane jamming as most of the movements are rotations inside self lubricated bushing, thus minimizing the wear on the components.

Figure 10:
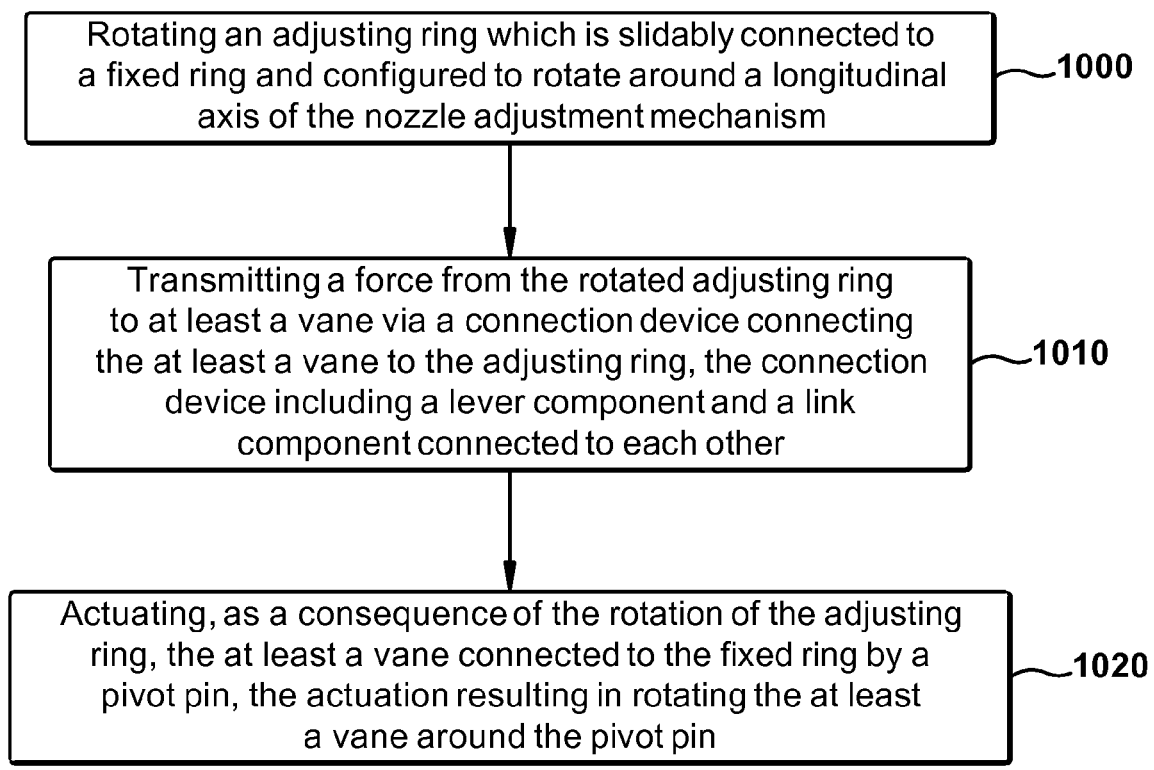
FIG. 10 is a flow chart illustrating steps for operating a nozzle adjustment mechanism according to an exemplary embodiment.

A method for operating a nozzle adjusting mechanism is now discussed with reference to FIG. 10. FIG. 10 shows the steps for adjusting an inflow of a fluid via the nozzle adjustment mechanism. The method includes a step 1000 of rotating an adjusting ring which is rotatably connected to a fixed ring and configured to rotate around a longitudinal axis of the nozzle adjustment mechanism. Step 1010 includes transmitting a force from the rotated adjusting ring to a vane via a connection mechanism connecting the vane to the adjusting ring, the connection mechanism including a lever component connected to the vane and a link component connected to the adjusting ring, the lever component and the link component being connected to each other. Step 1020 includes actuating, as a consequence of the rotation of the adjusting ring, the vane connected to the fixed ring by a pivot pin, the actuation resulting in rotating the vane with the pivot pin.

The disclosed exemplary embodiments provide a device and a method for adjusting a flow of a fluid through a nozzle adjusting mechanism. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements to those recited in the literal languages of the claims.

What is claimed is:

1. A nozzle adjustment mechanism, comprising:
   a fixed ring;
   at least a vane connected to the fixed ring by a pivot pin and configured to rotate with the pivot pin;
   an adjusting ring rotatably connected to the fixed ring and configured to rotate around a longitudinal axis of the nozzle adjustment mechanism; and
   a connection mechanism connecting the at least a vane to the adjusting ring and configured to move the at least a vane when the adjusting ring is rotated, the connection mechanism including a lever component and a link component connected to each other,
   wherein the lever component is connected to the at least a vane and the link component is connected to the adjusting ring, and
   wherein the adjusting ring is arranged directly over the connection mechanism in a direction of the longitudinal axis.

2. The nozzle of claim 1, further comprising:
   an extension ring connected to the fixed ring and rotatably supporting the adjusting ring, the extension ring separating the fixed ring from the adjusting ring such that the connection mechanism is sandwiched between the adjusting ring and the fixed ring.

3. The nozzle of claim 1, wherein the at least a vane is disposed on a first face of the fixed ring and the adjusting ring and the connection mechanism are disposed on a second face of the fixed ring, the first face being opposite to the second face.

4. The nozzle of claim 1, further comprising:
   a nozzle cover connected to the at least a vane via the pivot pin and arranged such that the at least a vane is sandwiched between the nozzle cover and the fixed ring.

5. The nozzle of claim 1, wherein the connection mechanism includes an intermediate link component connected between the lever component and the link component.

6. The nozzle of claim 1, wherein a longitudinal axis of the link component points to the longitudinal axis of the nozzle adjustment mechanism when the at least a vane is in a close position.

7. The nozzle of claim 1, wherein, when the at least a vane is in a close position, a predetermined rotation of the adjusting ring generates a first rotation of the at least a vane that opens the vane and, when the at least a vane is in an open position, the same predetermined rotation of the adjusting ring generates a second rotation of the at least a vane that closes the vane, and
   wherein the second rotation is smaller than the first rotation.

8. The nozzle of claim 1, wherein a ratio of a length of the lever component to a length of the link component is between 1 and 10.

9. The nozzle of claim 1, wherein the lever component rotates in one direction and the link component rotates in an opposite direction when the adjusting ring is actuated.

10. The nozzle of claim 1, wherein the at least a vane comprises:
    plural vanes rotationally fixed with corresponding pivot pins to the fixed ring and configured to rotate when actuated by the adjusting ring to fully close a space between the fixed ring and a nozzle cover.

11. A radial inflow turbine comprising:
    a frame; and
    a nozzle adjusting mechanism connected to the frame and configured to adjust an inflow of a fluid, wherein the nozzle adjusting mechanism includes,
    a fixed ring,
    at least a vane connected to the fixed ring by a pivot pin and configured to rotate with the pivot pin,
    an adjusting ring rotatably connected to the fixed ring and configured to rotate around a longitudinal axis of the nozzle adjustment mechanism, and
    a connection mechanism connecting the at least a vane to the adjusting ring and configured to move the at least a vane when the adjusting ring is rotated, the connection mechanism including a lever component and a link component connected to each other,
    wherein the lever component is connected to the at least a vane and the link component is connected to the adjusting ring, and
    wherein the adjusting ring is arranged directly over the connection mechanism in a direction of the longitudinal axis.

12. The turbine of claim 11, further comprising:
    an extension ring connected to the fixed ring and rotatably supporting the adjusting ring, the extension ring separating the fixed ring from the adjusting ring such that the connection mechanism is sandwiched between the adjusting ring and the fixed ring.

13. The turbine of claim 11, wherein the at least a vane is disposed on a first face of the fixed ring and the adjusting ring and the connection mechanism are disposed on a second face of the fixed ring, the first face being opposite to the second face.

14. The turbine of claim 11, further comprising:
a nozzle cover connected to the at least a vane via the pivot pin and arranged such that the at least a vane is sandwiched between the nozzle cover and the fixed ring.

15. A method for adjusting an inflow of a fluid via a nozzle adjustment mechanism, the method comprising:
rotating an adjusting ring which is rotatably connected to a fixed ring and configured to rotate about a longitudinal axis of the nozzle adjustment mechanism;
transmitting a force from the rotated adjusting ring to at least a vane via a connection mechanism connecting the at least a vane to the adjusting ring, the connection mechanism including a lever component and a link component connected to each other, wherein the adjusting ring is arranged directly over the connection mechanism in a direction of the longitudinal axis; and
actuating, as a consequence of the rotation of the adjusting ring, the at least a vane connected to the fixed ring by a pivot pin, the actuation resulting in rotating the at least a vane with the pivot pin, wherein the lever component is connected to the at least a vane and the link component is connected to the adjusting ring.

16. The method of claim 15, further comprising:
disposing the at least a vane on a first face of the fixed ring and the adjusting ring and the connection mechanism on a second face of the fixed ring, the first face being opposite to the second face.

17. The method of claim 15, further comprising:
providing an intermediate link component connected between the lever component and the link component.

18. The method of claim 15, further comprising:
aligning the link component to have a longitudinal axis pointing to the longitudinal axis of the nozzle adjustment mechanism when the at least a vane is in a close position.

19. The method of claim 15, further comprising:
when the at least a vane is in a close position, rotating the adjusting ring with a predetermined rotation to generate a first rotation of the at least a vane to open the vane; or
when the at least a vane is in an open position, rotating the adjusting ring with the same predetermined rotation to generate a second rotation of the at least a vane to close the vane, wherein the second rotation is smaller than the first rotation.

20. The method of claim 15, further comprising:
rotating the lever component in one direction and the link component in an opposite direction when the adjusting ring is actuated.

* * * * *